United States Patent

Monoi et al.

[11] Patent Number: 6,140,443
[45] Date of Patent: Oct. 31, 2000

[54] ETHYLENIC POLYMERS AND PROCESS FOR THE PRODUCTION THEREOF

[75] Inventors: Takashi Monoi; Masakazu Yamamoto; Hidenobu Torigoe; Yoshimitsu Ishihara; Shintaro Inazawa; Shigeki Saito, all of Oita, Japan

[73] Assignee: Showa Denko K.K., Tokyo, Japan

[21] Appl. No.: 09/202,137

[22] PCT Filed: Apr. 9, 1997

[86] PCT No.: PCT/JP97/01220

§ 371 Date: Dec. 9, 1998

§ 102(e) Date: Dec. 9, 1998

[87] PCT Pub. No.: WO98/45340

PCT Pub. Date: Oct. 15, 1998

[51] Int. Cl.[7] .................................................. C08F 110/02
[52] U.S. Cl. ..................... 526/352; 526/106; 526/129; 526/151; 526/348.1; 502/104; 502/117; 502/152
[58] Field of Search ...................... 502/104, 117, 502/152; 526/106, 129, 151, 348.1, 352

[56] References Cited

U.S. PATENT DOCUMENTS 4,212,765   7/1980   Gutweiler ................................. 502/108
5,723,399   3/1998   Takemoto et al. ...................... 502/113

FOREIGN PATENT DOCUMENTS 54-120290   9/1979   Japan.
9-25314    1/1999   Japan.

*Primary Examiner*—David W. Wu
*Assistant Examiner*—Ling-Siu Choi
*Attorney, Agent, or Firm*—Sughrue, Mion, Zinn, Macpeak & Seas, PLLC

[57] ABSTRACT

A blow-moldable or extrudable ethylene polymer having an excellent moldability which gives a molded product free of roughened surface, having: a number-average molecular weight Mn (V1) as determined from the amount of a terminal vinyl group by $^{13}$C-NMR measurement with respect to a fraction having a number-average molecular weight Mn of 100,000 according to GPC; and a number-average molecular weight Mn (V2) as determined from the amount of a terminal vinyl group by $^{13}$C-NMR measurement with respect to a fraction having a number-average molecular weight Mn of 10,000 according to GPC, Mn(V1) and Mn(V2) satisfying the following relationship:

$$1.01 \leq \log_{10}\{Mn(V1)/Mn(V2)\} \leq 3.0$$

and having a melt flow rate (HLMFR) of from 0.1 to 70 g/10 min.

8 Claims, 1 Drawing Sheet

FIG. 1

ETHYLENIC POLYMERS AND PROCESS FOR THE PRODUCTION THEREOF

TECHNICAL FIELD

The present invention relates to an ethylene polymer and a process for the production thereof. More particularly, the present invention relates to a blow-moldable or extrudable ethylene polymer having an excellent moldability which gives a molded product free of roughened surface, and to a process for the production of an ethylene polymer having an excellent moldability in the presence of a novel catalyst comprising chromic acid ester, an alumoxane, an organic aluminum alkoxide and/or an organic aluminum siloxide all supported on a carrier.

BACKGROUND OF THE INVENTION

In general, an ethylene polymer is widely used as a resin material for various molded products. The ethylene polymer must satisfy different requirements depending on its molding method and purpose. For example, an ethylene polymer having a relatively low molecular weight and a narrow molecular weight distribution is suitable for injection molding. On the other hand, an ethylene polymer having a relatively high molecular weight and a wide molecular weight distribution is suitable for blow molding or extrusion. It has heretofore been known that the use of a so-called Phillips catalyst comprising chromium trioxide supported on an inorganic oxide such as silica can provide an ethylene polymer having a wide molecular weight distribution suitable for blow molding. Further, a single-stage or multi-stage polymerization process using a Ziegler catalyst disclosed in JP-A-2-123108 (The term "JP-A" as used herein means an "unexamined published Japanese patent application"), JP-A-4-18407 and JP-A-5-230136 can provide an ethylene polymer having a wide molecular weight distribution suitable for blow molding and extrusion.

However, it has recently been desired to further enhance the quality of ethylene polymers suitable for blow molding and extrusion. A molded product obtained by blow-molding or extruding an ethylene polymer having a wide molecular weight distribution produced in the presence of the foregoing catalyst leaves something to be desired in some respects. (1) Referring to moldability, since the ethylene polymer has an insufficient melt tension and die swell, the resulting blow-molded product has an uneven thickness. Further, the ethylene polymer has a poor bubble stability during extrusion. (2) Since the molded product has a roughened surface, it is undesirable from the standpoint of external appearance.

A process for the production of an ethylene polymer having a wide molecular weight distribution using a catalyst made of a chromium compound and an alumoxane has recently been disclosed in JP-W-A-7-503739 (The term "JP-W-A" as used herein means an "published Japanese national stage of international application"). However, the ethylene polymer obtained by this process leaves something to be desired both in moldability and surface properties of molded product.

Further, JP-A-2-105806 and JP-A-2-185506 disclose a process for the production of an ethylene polymer having a wide molecular weight distribution suitable for blow molding and extrusion in the presence of a catalyst made of a solid catalyst component comprising chromium trioxide supported on an inorganic oxide carrier, an alumoxane, an organic aluminum alkoxide or an organic aluminum siloxide. However, the ethylene polymer obtained by this process, too, leaves something to be desired both in moldability and surface properties of molded product.

Moreover, JP-A-54-120290 discloses a process for the production of an ethylene polymer having a wide molecular weight distribution suitable for blow molding and extrusion in the presence of a catalyst made of a solid component obtained by treating a chromic acid ester supported on silica with an organic aluminum alkoxide and an alumoxane. However, the ethylene polymer obtained by this process, too, leaves something to be desired both in moldability and surface properties of molded product.

An object of the present invention is to give solution to the foregoing problems and hence produce efficiently an ethylene polymer having an excellent moldability which gives a molded product free of roughened surface.

DISCLOSURE OF THE INVENTION

The inventors made extensive studies of the foregoing problems. As a result, it was found that when polymerization is effected in the presence of a catalyst comprising a chromic acid ester, an alumoxane, an organic aluminum alkoxide and/or an organic siloxide all supported on a carrier while the content of high molecular components is being controlled, a blow-moldable or extrudable ethylene polymer having an excellent moldability can be obtained. Thus, the foregoing problems can be solved. In other words, the present invention concerns the following constitutions:

(1) A blow-moldable or extrudable ethylene polymer having:

a number-average molecular weight Mn (V1) as determined from the amount of a terminal vinyl group by $^{13}$C-NMR measurement with respect to a fraction having a number-average molecular weight Mn of 100,000 according to GPC; and a number-average molecular weight Mn (V2) as determined from the amount of a terminal vinyl group by $^{13}$C-NMR measurement with respect to a fraction having a number-average molecular weight Mn of 10,000 according to GPC, Mn(V1) and Mn(V2) satisfying the following relationship:

$$1.01 \leq \log_{10}\{Mn(V1)/Mn(V2)\} \leq 3.0$$

and having a melt flow rate (HLMFR) of from 0.1 to 70 g/10 min; and (2) A process for the production of a blow-moldable or extrudable ethylene polymer which comprises the production of an ethylene polymer in the presence of a catalyst comprising (a) a chromic acid ester, (b) an alumoxane and (c) an organic aluminum alkoxide and/or organic aluminum siloxide all supported on a carrier, wherein the content of high molecular components is controlled such that said ethylene polymer exhibits:

a number-average molecular weight Mn (V1) as determined from the amount of a terminal vinyl group by $^{13}$C-NMR measurement with respect to a fraction having a number-average molecular weight Mn of 100,000 according to GPC; and a number-average molecular weight Mn (V2) as determined from the amount of a terminal vinyl group by $^{13}$C-NMR measurement with respect to a fraction having a number-average molecular weight Mn of 10,000 according to GPC, Mn(V1) and Mn(V2) satisfying the following relationship:

$$1.01 \leq \log_{10}\{Mn(V1)/Mn(V2)\} \leq 3.0$$

The foregoing melt flow rate (HLMFR) is measured at a temperature of 190° C. under a load of 21.6 Kgf according to Condition 7 set forth in Table 1 of JIS K-7210.

Preferred embodiments of the process for the production of an ethylene polymer (2) are given below.

a) Process for the production of an ethylene polymer which comprises liquid phase polymerization of ethylene in the presence of hydrogen supplied into the polymerization reactor under the following condition: $5.0 \times 10^{-6} \leq$ Hydrogen concentration in liquid phase (wt-%)/Ethylene concentration in liquid phase (wt-%) $\leq 5.0 \times 10^{-3}$.

b) Process for the production of an ethylene polymer which comprises gas phase polymerization of ethylene in the presence of hydrogen supplied into the polymerization reactor under the following condition: $5.0 \times 10^{-4} \leq$ Hydrogen partial pressure in gas phase (Kg/cm$^2$)/Ethylene partial pressure in gas phase (Kg/cm$^2$) $\leq 5.0 \times 10^{-1}$.

c) Process for the production of an ethylene polymer using a catalyst obtained by allowing (a) a chromic acid ester to be supported on a carrier and contacting the supported chromic acid ester with (b) an alumoxane and (c) an organic aluminum alkoxide and/or organic aluminum siloxide.

d) Process for the production of an ethylene polymer using a catalyst wherein the mixing ratios of (a) chromic acid ester to other components,(b) and (c) are as follows:

the molar ratio of aluminum atom in an alumoxane/chromium atom is from 0.5/1 to 100/1;

the molar ratio of aluminum atom in (c) organic aluminum alkoxide and/or organic aluminum siloxide/chromium atom is from 0.5/1 to 100/1; and the molar ratio of (b) an alumoxane to (c) organic aluminum alkoxide and/or organic aluminum siloxide is from 0.01/1 to 100/1.

e) Process for the production of an ethylene polymer using a catalyst wherein the carrier is an inorganic metal oxide and/or inorganic halide.

f) Process for the production of an ethylene polymer using a catalyst comprising a carrier having a specific surface area of from 50 to 1,000 m$^2$/g, a pore volume of from 0.5 to 3.0 cm$^3$/g and an average particle diameter of from 10 to 200 μm, and a chromium atom supported on the carrier in an amount of from 0.05 to 5.0 wt-% based on the weight of the carrier.

BEST MODE FOR CARRYING OUT THE INVENTION

The chromic acid ester (component (a)) to be used in the present invention is a chromium (VI) compound represented by the following general formula (1):

(1)

wherein $R^1$, $R^2$, $R^3$, $R^4$, $R^5$ and $R^6$ may be the same or different and each represent a $C_{1-18}$, preferably $C_{1-6}$ hydrocarbon group, preferably an alkyl or aryl group; and $M^1$ and $N^2$ each represents a carbon or silicon atom.

Specific examples thereof wherein $M^1$ and $M^2$ each represents a carbon atom include bis(tert-butyl) chromate, bis(1,1-dimethylpropyl) chromate, bis(2-phenyl-2-propyl) chromate, bis(1,1-diphenylethyl) chromate, bis(triphenylmethyl) chromate, bis(1,1,2,2-tetramethylpropyl) chromate, and bis(1,1,2-trimethylpropyl) chromate. Preferred among these chromium (VI) compounds is bis(tert-butyl) chromate.

Specific examples wherein $M^1$ and $M^2$ each represents a silicon atom include bis(trimethylsilyl) chromate, bis(triethylsilyl) chromate, bis(tributylsilyl) chromate, bis(triisopentylsilyl) chromate, bis(tri-2-ethylhexylsilyl) chromate, bis(tridecylsilyl) chromate, bis(tri(tetradecyl)silyl) chromate, bis(tribenzylsilyl) chromate, bis(triphenethylsilyl) chromate, bis (triphenylsilyl) chromate, bis(tritollylsilyl) chromate, bis(trixylylsilyl) chromate, bis(trinaphthylsilyl) chromate, bis(dimethylphenylsilyl) chromate, bis(diphenylmethylsilyl) chromate, bis(dimethyltexylsilyl) chromate, bis(dimethyl isopropylsilyl) chromate, bis(tert-butyldimethylsilyl) chromate, bis(tri-tert-butylsilyl) chromate, bis(triethyl phenylsilyl) chromate, and bis(trimethylnaphthylsilyl) chromate. Preferred among these chromium (VI) compounds is bis(triphenylsilyl) chromate.

The alumoxane (component (b)) is a compound well known in the art, and its production process and structure are described in detail in Polyhedron, 9, pp. 429–453 (1990), Ziegler Catalysts, G. Fink et al. (Eds.) pp. 57–82, Springer-Verlag (1995), etc. Examples of the alumoxane to be used in the present invention include compounds represented by the following general formulae (2) and (3):

(2)

(3)

wherein $R^7$ represents a hydrocarbon group such as methyl, ethyl, propyl, n-butyl and isobutyl, preferably methyl or isobutyl; and q represents an integer of from 1 to 100, preferably not less than 4, particularly not less than 8.

The processes for the preparation of these kinds of compounds are known. Examples of the process for the preparation of this kind of compound include a process which comprises adding trialkyl aluminum to a suspension of a salt having water of crystallization (hydrated copper sulfate, hydrated aluminum sulfate, etc.) in an inert hydrocarbon solvent, and a process which comprises allowing solid, liquid or gaseous water to act on trialkyl aluminum in a hydrocarbon solvent.

Further, an alumoxane represented by the general formula (4) or (5) may be used.

(4)

(5)

wherein $R^8$ represents a hydrocarbon group such as methyl, ethyl, propyl, n-butyl and isobutyl, preferably methyl or isobutyl; $R^9$ differs from $R^8$ and represents a group selected from hydrocarbon group such as methyl, ethyl, propyl, n-butyl and isobutyl, halogen such as chlorine and bromine, hydrogen atom and hydroxyl group, a plurality of $R^9$ may be the same or different; and r represents an integer of normally from 1 to 100, preferably not less than 3, with the proviso that the sum of r and s is from 2 to 101, preferably not less than 6.

In the compound represented by the foregoing general formula (4) or (5), $(O\text{—}Al(R^8))_r$ unit and $(O\text{—}Al(R^9))_s$ unit may be connected in a blocked manner or regularly or irregularly at random. The preparation of such an alumoxane can be accomplished in the same manner as the alumoxanes of the foregoing general formulae except that two or more trialkyl aluminums or one or more dialkyl aluminum monohalides or dialkyl aluminum monohydrides are used instead of the one trialkyl aluminum.

The organic aluminum alkoxide and/or organic aluminum siloxide (component (c)) to be used in the present invention is a compound represented by the following general formula (6) or (7):

(6)

wherein $R^{10}$ and $R^{11}$ may be the same or different and each represents a $C_{1-18}$, preferably $C_{1-6}$ hydrocarbon group, preferably an alkyl or aryl group; and t represents 1 or 2;

(7)

wherein $R^{12}$, $R^{13}$, $R^{14}$, $R^{15}$ and $R^{16}$ may be the same or different and each represents a $C_{1-18}$, preferably $C_{1-6}$ hydrocarbon group, preferably an alkyl or aryl group.

Specific examples of the organic aluminum alkoxide represented by the foregoing general formula (6) include dimethyl aluminum methoxide, dimethyl aluminum ethoxide, dimethyl aluminum isopropoxide, dimethyl aluminum n-butoxide, dimethyl aluminum isobutoxide, diethyl aluminum ethoxide, diethyl aluminum isopropoxide, diethyl aluminum n-butoxide, diethyl aluminum isobutoxide, diisobutyl aluminum ethoxide, diisobutyl aluminum isopropoxide, diisobutyl aluminum n-butoxide, diisobutyl aluminum isobutoxide, di-n-hexyl aluminum ethoxide, di-n-hexyl aluminum isopropoxide, di-n-hexyl aluminum n-butoxide, di-n-hexyl aluminum isobutoxide, methyl aluminum dimethoxide, methyl aluminum diethoxide, methyl aluminum diisopropoxide, methyl aluminum di-n-butoxide, methyl aluminum diisobutoxide, ethyl aluminum diethoxide, ethyl aluminum diisopropoxide, ethyl aluminum di-n-butoxide, ethyl aluminum diisobutoxide, isobutyl aluminum diethoxide, isobutyl aluminum diisopropoxide, isobutyl aluminum di-n-butoxide, isobutyl aluminum diisobutoxide, n-hexyl aluminum diethoxide, n-hexyl aluminum diisopropoxide, n-hexyl aluminum di-n-butoxide, and n-hexyl aluminum diisobutoxide.

Preferred among these organic aluminum alkoxides are monoalkoxides such as dimethyl aluminum methoxide, dimethyl aluminum ethoxide, dimethyl aluminum isopropoxide, dimethyl aluminum n-butoxide, dimethyl aluminum isobutoxide, diethyl aluminum ethoxide, diethyl aluminum isopropoxide, diethyl aluminum n-butoxide, diethyl aluminum isobutoxide, diisobutyl aluminum ethoxide, diisobutyl aluminum isopropoxide, diisobutyl aluminum n-butoxide, diisobutyl aluminum isobutoxide, di-n-hexyl aluminum ethoxide, di-n-hexyl aluminum isopropoxide, di-n-hexyl aluminum n-butoxide and di-n-hexyl aluminum isobutoxide.

Specific examples of the organic aluminum siloxide represented by the foregoing general formula (7) include trimethyl dimethyl siloxyalane, trimethyl diethyl siloxyalane, trimethyl diisobutyl siloxyalane, trimethyl di-n-hexyl siloxyalane, triethyl dimethyl siloxyalane, triethyl diethyl siloxyalane, triethyl diisobutyl siloxyalane, triethyl di-n-hexyl siloxyalane, triphenyl dimethyl siloxyalane, triphenyl diethyl siloxyalane, triphenyl diisobutyl siloxyalane, and triphenyl di-n-hexyl siloxyalane.

Preferred among these organic aluminum siloxides are trimethyl dimethyl siloxyalane, trimethyl diethyl siloxyalane, trimethyl diisobutyl siloxyalane, trimethyl di-n-hexyl siloxyalane, triethyl dimethyl siloxyalane, triethyl diethyl siloxyalane, triethyl-diisobutyl siloxyalane, and triethyl di-n-hexyl siloxyalane.

The foregoing organic aluminum siloxide can be synthesized by any known method as described below:

1) The reaction of a silanol compound represented by the general formula $R^{12}R^{13}R^{14}Si\text{—}OH$ with an organic aluminum compound represented by the general formula $R^{15}R^{16}RAl$;

2) The reaction of a cyclic siloxane with an organic aluminum compound represented by the general formula $R^{15}R^{16}RAl$; and 3) The reaction of a polysiloxane with an organic aluminum compound represented by the general formula $R^{15}R^{16}RAl$.

In the foregoing processes 1) to 3), $R^{12}$ to $R^{16}$ are as defined in the foregoing general formula (7), and R represents a group similar to $R^{12}$ to $R^{16}$ in the general formula (7) which is substituted in these reactions.

The organic aluminum alkoxides and/or organic aluminum siloxides represented by the foregoing general formulae (6) and (7) may be used singly or in combination.

The catalyst of the present invention is used supported on a carrier such as inorganic oxide (solid acid or Lewis acid) and inorganic halide. As the inorganic oxide to be used as carrier there may be used an oxide of metal belonging to the group 2, 4, 13 or 14. Specific examples of such a metal oxide include magnesia, titania, zirconia, alumina, aluminum phosphate, silica, silica-titania, silica-zirconia, silica-alumina, and mixture thereof. In the present invention, an inorganic oxide having a specific surface area of from 50 to 1,000 m²/g, preferably from 200 to 800 m²/g, a pore volume of from 0.5 to 3.0 cm³/g, preferably from 1.0 to 2.5 cm³/g, and an average particle diameter of from 10 to 200 μm, preferably from 50 to 150 μm is preferably used.

These inorganic oxides are preferably calcined at a temperature of from 100° C. to 900° C. in a stream of nitrogen gas while being passed through a molecular sieves for 10 minutes to 24 hours before use. Thus, these inorganic oxides are preferably calcined in a sufficient amount of nitrogen gas while being fluidized in solid form.

As the inorganic halide to be used as carrier there may be used a halide of metal belonging to the group 2 or 13. Examples of the metal halide include magnesium chloride, magnesium bromide, magnesium iodide, calcium chloride, aluminum chloride, gallium chloride, and mixture thereof.

As the method for obtaining a catalyst from the foregoing constituent components there may be used a method which comprises introducing a chromic acid ester, an alumoxane, an organic aluminum alkoxide and/or an organic aluminum siloxide, and a carrier into a reactor for the preparation of a catalyst where a catalyst is then prepared. In particular, a method is preferably used which comprises supporting a chromic acid ester on a carrier, and then supporting an alumoxane, an organic aluminum alkoxide and/or an organic aluminum siloxide thereon.

In order to support the chromic acid ester on the carrier, the chromic acid ester may be supported on the carrier in the form of solid or liquid as it is or in a form diluted with an inert hydrocarbon solvent mentioned later. The time required for the addition of a predetermined amount of a chromic acid ester is arbitrary normally within 2 hours, preferably 1 hour. The temperature at which the chromic acid ester is supported on the carrier is normally from 0° C. to 70° C., preferably from 10° C. to 60° C. The time during which the chromic acid ester comes in contact with the carrier is normally from 5 minutes to 24 hours, preferably from 30 miniutes to 6 hours.

In order to support the alumoxane and the organic aluminum alkoxide and/or organic aluminum siloxide on the carrier, any one of the following methods may be employed:

(A) A method which comprises supporting an alumoxane on a carrier, and then supporting an organic aluminum alkoxide and/or organic aluminum siloxide thereon;

(B) A method which comprises supporting an organic aluminum alkoxide and/or organic aluminum siloxide on a carrier, and then supporting an alumoxane thereon; and (C) A method which comprises supporting a mixture of an alumoxane and an organic aluminum alkoxide and/or organic aluminum siloxide on a carrier.

Preferred among these methods is the method (A).

The foregoing supporting operation may be effected in the presence or absence of solvent. As such a solvent, if any, there is preferably used an inert hydrocarbon such as propane, butane, isobutane, pentane, hexane, heptane, cyclohexane, decane, benzene, toluene and xylene. The amount of the solvent to be used is not more than 1 l per g of the carrier. After supporting, the solvent can be separated from the catalyst by being removed or filtered under reduced or ordinary pressure. The amount of the chromic acid ester to be supported on the carrier is from 0.05 to 5.0 wt-%, preferably from 0.05 to 2.0 wt-% based on the weight of the carrier as calculated in terms of chromium atom.

The amount of the alumoxane to be supported on the carrier is from 0.5/1 to 100/1, preferably from 1/1 to 50/1 as calculated in terms of the molar ratio of aluminum atom to chromium atom.

The amount of the organic aluminum alkoxide and/or organic aluminum siloxide to be supported on the carrier is from 0.5/1 to 100/1, preferably 1/1 to 50/1 as calculated in terms of the molar ratio of aluminum atom in the organic aluminum alkoxide and/or organic aluminum siloxide to chromium atom.

The molar ratio of alumoxane to organic aluminum alkoxide and/or organic aluminum siloxide is from 0.01/1 to 100/1, preferably from 0.1/1 to 50/1.

The reaction temperature at which the supporting operation is effected is from 0° C. to 100° C. The reaction time during which the supporting operation is effected is from 5 minutes to 24 hours.

The production of the ethylene polymer of the present invention in the presence of the foregoing catalyst can be accomplished by a liquid phase polymerization process such as slurry polymerization and solution polymerization or a gas phase polymerization process.

As the gas phase polymerization process there may be employed a known polymerization process such as fluidized bed polymerization and agitated bed polymerization in the presence of an inert gas. If necessary, a so-called condensing mode involving the existence of a medium for the removal of polymerization heat may be employed.

The liquid phase polymerization process is normally effected in a hydrocarbon solvent. As the hydrocarbon solvent there may be used singly or in admixture inert hydrocarbons such as propane, butane, isobutane, hexane, cyclohexane, heptane, benzene, toluene and xylene.

The temperature at which the liquid phase or gas phase polymerization process is effected is normally from 0° C. to 300° C., practically from 20° C. to 200° C. If necessary, α-olefins such as propylene, 1-butene, 1-hexene, 4-methyl-1-pentene, 1-octene and α, ω-diene may be introduced into the reactor singly or in combination so that copolymerization takes place. The content of α-olefin in the resulting polymer is preferably not more than 10 mo-%, more preferably not more than 5 mol-%. In order to obtain an ethylene polymer of the present invention having an excellent moldability which gives a blow-molded or extruded film product free of roughened surface, it is important to control the content of the high molecular components. The catalyst of the present invention causes problems such as excess die swell ratio (SR) attributed to high molecular components. Thus, hydrogen can be present in the polymerization reactor during polymerization to obtain a polymer suitable for the purpose of the present invention.

The catalyst system to be used in the present invention shows a specific behavior in the presence of hydrogen. In particular, the catalyst system of the present invention acts effectively on the high molecular components. As a result, a resin useful for blow molding or extrusion can be provided. The amount of hydrogen to be present in the polymerization reactor during polymerization preferably falls within the following ranges in the liquid phase polymerization process and gas phase polymerization process:

In the case of liquid phase polymerization process:
$5.0 \times 10^{-6} \leq$ Hydrogen concentration (wt-%) in liquid phase/Ethylene concentration (wt-%) in liquid phase $\leq 5.0 \times 10^{-3}$, More preferably,
$8.0 \times 10^{-6} \leq$ Hydrogen concentration (wt-%) in liquid phase/Ethylene concentration (wt-%) in liquid phase $\leq 2.0 \times 10^{-3}$, Particularly,
$1.0 \times 10^{-6} \leq$ Hydrogen concentration (wt-%) in liquid phase/Ethylene concentration (wt-%) in liquid phase $\leq 1.0 \times 10^{-3}$ In the case of gas phase polymerization process:
$5.0 \times 10^{-4} \leq$ Hydrogen partial pressure in gas phase (Kg/cm$^2$)/Ethylene partial pressure in gas phase (Kg/cm$^2$) $\leq 5.0 \times 10^{-1}$, More preferably,
$8.0 \times 10^{-4} \leq$ Hydrogen partial pressure in gas phase (Kg/cm$^2$)/Ethylene partial pressure in gas phase (Kg/cm$^2$) $\leq 2.0 \times 10^{-1}$, Particularly,
$1.0 \times 10^{-3} \leq$ Hydrogen partial pressure in gas phase (Kg/cm$^2$)/Ethylene partial pressure in gas phase (Kg/cm$^2$) $\leq 1.0 \times 10^{-1}$ If the amount of hydrogen to be present in the polymerization reactor during polymerization falls below the lower limit in the liquid phase polymerization process or gas phase polymerization process, the resulting ethylene polymer exhibits an excellent moldability but shows a high melt tension that may gives a great die swell. Such an ethylene polymer tends to give a blow-molded or extruded produce having a roughened surface and a deteriorated external appearance. On the contrary, if the amount of hydrogen to be present in the polymerization reactor during polymerization exceeds the upper limit in the liquid phase polymerization process or gas phase polymerization process, the resulting blow-molded or extruded product has no roughened surface and a very good external appearance, but the ethylene polymer exhibits a low melt tension that may give a small die swell and hence tends to give a deteriorated moldability.

The use of the foregoing polymerization process using the foregoing catalyst makes it possible to obtain an ethylene polymer having a melt flow rate suitable for blow molding or extrusion. The value of melt flow rate is defined by HLMFR determined by the measurement method used in the following examples and comparative examples. The ethylene polymer of the present invention preferably exhibits HLMFR of from 0.1 to 70. If it is to be blow-molded into a small product such as detergent bottle, cosmetic bottle and food bottle, the ethylene polymer exhibits HLMFR of from 10 to 70, preferably from 15 to 60, more preferably from 20 to 50. If it is to be blow-molded into a large-sized product such as drum, pallet and gasoline tank, the ethylene polymer exhibits HLMFR of from 0.1 to 20, preferably from 0.5 to 15, more preferably from 1.0 to 10. If it is to be extruded into a product such as film, sheet and pipe, the ethylene polymer exhibits HLMFR of from 5 to 40, preferably from 7 to 30, more preferably from 10 to 20. If it is to be extruded, the ethylene polymer is preferably used as a film in particular.

The ethylene polymer of the present invention is fractionated into at least five ranges in the number-average molecular weight ranging from 3,000 to 300,000 in such a manner that the ratio (Mw/Mn) of weight-average molecular weight (Mw) to number-average molecular weight (Mn) is not more than 1.8 in each fraction. From a graph obtained from the number-average molecular weights of the respective components determined by GPC and those determined from a terminal vinyl group by $^{13}$C-NMR, Mn (V2) and Mn (V1) at the points corresponding to fractions of number-average molecular weights of 10,000 and 100,000 obtained by GPC, respectively, can be determined.

For the measurement of the respective fractions by $^{13}$C-NMR, the number of terminal vinyl groups per 1000 carbon chains is determined on the basis of the signal intensity (allyl-terminated signal intensity) of carbon adjacent to terminal vinyl group at 33.9 ppm ("NMR-Introduction and Experimental Guide [1]", Kagaku no Ryoiki, No. 141, Nankodo, page 131, "$^{13}$C-NMR of high molecular compounds"). The number-average molecular weight Mn (V) is calculated from terminal vinyl group by the following equation:

$$Mn(V) = (1000/\text{number of terminal vinyl groups per 1000 carbon chains}) \times 14.$$

If the ethylene polymer is fractionated by molecular weight to have:

a number-average molecular weight Mn (V1) as determined from the amount of a terminal vinyl group by $^{13}$C-NMR measurement with respect to a fraction having a number-average molecular weight Mn of 100,000 according to GPC; and a number-average molecular weight Mn (V2) as determined from the amount of a terminal vinyl group by $^{13}$C-NMR measurement with respect to a fraction having a number-average molecular weight Mn of 10,000 according to GPC, Mn(V1) and Mn(V2) satisfying the following relationship:

$$1.01 \leq \log_{10}\{Mn(V1)/Mn(V2)\} \leq 3.0,$$

an ethylene polymer which exhibits a high melt tension and a great die swell and thus can be fairly blow-molded or extruded to give a molded product free of roughened surface can be obtained.

Preferably, $$1.05 \leq \log_{10}\{Mn(V1)/Mn(V2)\} \leq 2.5$$

More preferably, $$1.10 \leq \log_{10}\{Mn(V1)/Mn(V2)\} \leq 2.0$$

If $\leq \log_{10}\{Mn(V1)/Mn(V2)\}$ value falls below 1.01, the resulting ethylene polymer exhibits a high melt tension and a great die swell and hence an excellent moldability but gives a blow-molded or extruded film product having a roughened surface and hence a drastically deteriorated external appearance. On the contrary, if $\leq \log_{10}\{Mn(V1)/Mn(V2)\}$ exceeds 3.0, the resulting blow-molded or extruded product has no roughened surface and a very good external appearance, but the ethylene polymer exhibits a low melt tension that may give a small die swell and hence tends to give a deteriorated moldability.

EXAMPLES

The present invention will be further described in the following examples and comparative examples, but the present invention should not be construed as being limited thereto.

The measurement methods used in the following examples and comparative examples will be described hereinafter.

a) Fractionation by Molecular Weight 2 g of the sample is dissolved in 400 ml of xylene with 60 g of Celite at a temperature 135° C. To the solution is then added 200 ml of butyl cellosolve. The mixture is then cooled to room temperature at a rate of 10° C./hr. The resulting slurry is packed in a column, and then subjected to thorough substitution by butyl cellosolve. The eluate discharged during packing and substitution is recovered as an ordinary extract. The sample is batchwise fractionated at a temperature of 126° C. with 100/0, 80/20, 70/30, 60/40, 55/45, 50/50 and 0/100 mixtures of butyl cellosolve and xylene. The fractionation with these various solvent mixtures is effected until there occurs no polymer precipitation by methanol. The sample is then allowed to cool to room temperature. The various fractions are recovered, dried, and then measured out.

b) GPC

The various fractions obtained in the measurement method (a) are then measured for gel permeation chromatography under the following conditions to determine number-average molecular weight (Mn) and weight-average molecular weight (Mw).

Apparatus: Type 150C, produced by WATERS CO., LTD.

Column: Shodex-HT806M

Solvent: 1,2,4-Trichlorobenzene

Temperature: 135° C.

Sample concentration: 2 mg/5 ml

Using a monodisperse polystyrene fraction, the sample is subjected to universal evaluation. The weight-average molecular weight (Mw) of the sample is then determined by a molecular weight conversion equation based on Q factor described in Sadao Mori, "Size exclusion chromatography", Kyoritsu Shuppan (1991).

In some detail, the following equation is used:

$$M_{PE} = 0.429 \times M_{PS}$$

wherein $M_{PS}$: Molecular weight of polystyrene at a certain elution time $M_{PE}$: Molecular weight of polyethylene at the same elution time c) $^{13}$C-NMR The various fractions obtained in the foregoing measurement process (a) are measured for $^{13}$C-NMR under the following conditions to determine the number of terminal vinyl groups per 1,000 carbon chains. In order to correct the relaxation time ($T_1$) of carbon atom in terminal vinyl group, the real intensity during $^{13}$C-NMR measurement is divided by 0.73.

Apparatus: JMX-GSX400

Solvent: 1,2,4-Trichlorobenzene/benzene-d6/hexamethyl disiloxane (mixing ratio:30/10/1)

Temperature: 120° C.

Sample concentration: 0.3 g/3 ml

Pulse repetition time: 2 sec.

The number-average molecular weight Mn (V) is calculated from determination of terminal vinyl group by the following equation:

$$Mn(V)=(1000/\text{number of terminal vinyl groups per 1000 carbon chains})\times 14$$

d) Mn (V1), Mn (V2)

Figure 1:
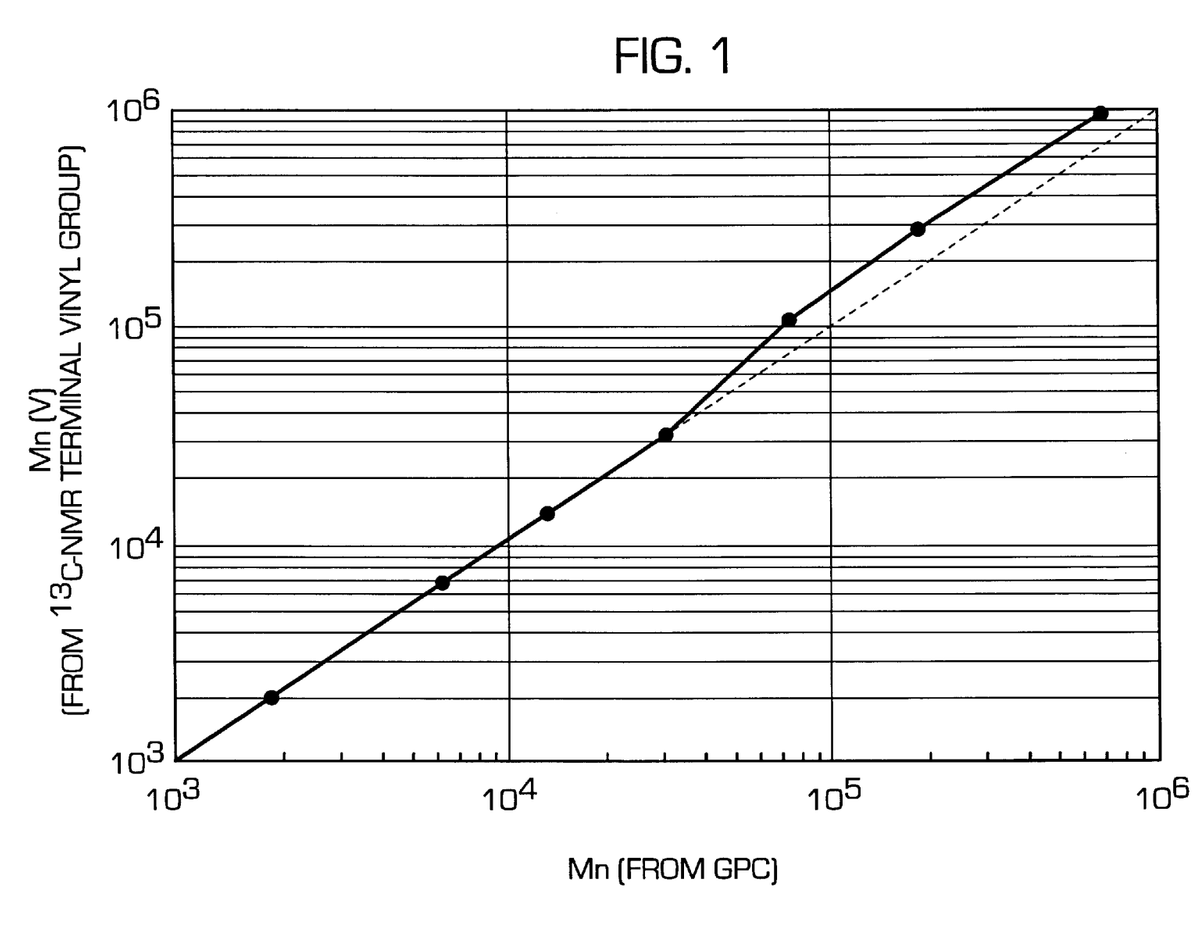
FIG. 1 is a log-log graph illustrating a plot of number-average molecular weight Mn (V) determined from the amount of a terminal vinyl group by $^{13}$C-NMR measurement vs. number-average molecular weight Mn according to GPC with respect to various fractions of the polyethylene obtained in Example 1.

The number-average molecular weight Mn (V) determined from determination of terminal vinyl group by $^{13}$C-NMR measurement of various fractions is plotted vs. the number-average molecular weight Mn by GPC of various fractions on a log-log graph. On this graph, Mn (V1) at Mn of 100,000 by GPC and Mn (V2) at Mn of 10,000 are then determined.

e) Melt Flow Rate

The powder obtained by polymerization is measured for HLMFR (g/10 min.) at a temperature of 190° C. under a load of 21.6 Kgf under Condition 7 set forth in Table 1 of JIS K-7210 (1996 Edition) and HLMFR (g/10 min.) at a temperature of 190° C. under a load of 10 Kgf under Condition 6 set forth in the same table.

f) Flow Ratio

The flow ratio is defined by HLMFR/MLMFR. The greater this value is, the wider is the molecular weight distribution.

g) Die Swell Ratio (SR)

The die swell ratio is defined by the percent swell of the extruded product with respect to the orifice diameter of the outer die (2.1 mm) during measurement of HLMFR. If the extruded product undergoes melt fracture to have a roughened surface, the resulting blow-molded or extruded product, too, has a roughened surface and hence a deteriorated external appearance.

h) Melt Tension

Using a plastograph produced by Toyo Seiki Seisakusho, Ltd., the polymer thus obtained is kneaded with 0.2 wt-% of B225 produced by Ciba Geigy Inc. as an additive at a temperature of 190° C. in an atmosphere of nitrogen for 7 minutes. The polymer thus kneaded is then measured for melt tension at a resin temperature of 210° C., an orifice diameter of 2.1 mm, an orifice length of 8 mm, an extrusion rate of 15 mm/min. and a winding rate of 6.5 m/min. by means of a melt tension tester produced by Toyo Seiki Seisakusho, Ltd.

Example 1

(1) Synthesis of Trimethyl Diethyl Siloxyalane 44.4 ml of a 1.0 mol/l hexane solution of triethyl aluminum produced by Tosoh Akzo Corporation was cooled to 0 to 5° C. To the solution was then added dropwise 5.6 ml (50 mmol) of trimethyl silanol produced by Shin-Etsu Chemical Co., Ltd. Thereafter, the reaction mixture was stirred at a temperature of 25° C. for 30 minutes to obtain a 1.0 mol/l hexane solution of trimethyl diethyl siloxyalane.

(2) Synthesis of Bis(tert-butyl) Chromate

Chromium trioxide and tert-butanol were reacted with each other in accordance with the method described in Synth. Commun., 10, 905 (1980) to synthesize bis(tert-butyl) chromate.

(3) Preparation of Catalyst

Into a 100 ml flask in which the air within had been replaced by nitrogen were charged 4.0 g of ES70 grade silica (specific surface area: 320 m$^2$/g; pore volume: 2.0 cm$^3$/g; average particle diameter: 40 μm) produced by Crosfield Corp. which had been calcined at a temperature of 500° C. for 6 hours and 40 ml of n-hexane to make a slurry. To the slurry thus obtained was then added 1.5 ml of a 0.1 mol/l hexane solution of bis(tert-butyl) chromate. The mixture was then stirred at a temperature of 35° C. for 1 hour. When the stirring was terminated, 0.6 ml of a 1.0 mol/l toluene solution of methyl alumoxane produced by Tosoh Akzo Corporation was added to the mixture. The mixture was then stirred at a temperature of 35° C. for 1 hour. When the stirring was terminated, 0.6 ml of a 1.0 mol/l hexane solution of trimethyl diethyl siloxyalane synthesized in the foregoing synthesis process (1). The mixture was then stirred at a temperature of 35° C. for 1 hour. The solvent was then removed from the mixture in vacuo to obtain a supported powdery catalyst having a free fluidity.

(4) Polymerization

Into a 1 l autoclave in which the air within had been replaced by nitrogen were charged 500 ml of isobutane and 400 mg of the catalyst prepared in the foregoing preparation process (3). The autoclave was heated to a temperature of 80° C. where hydrogen was then introduced thereinto at a partial pressure of 0.2 Kg/cm$^2$ (hydrogen concentration in isobutane: $1.0\times 10^{-3}$ wt-%). Ethylene was then pressed into the autoclave at 28 Kg/cm$^2$ (ethylene concentration in isobutane: 16.9 wt-%; hydrogen concentration (wt-%)/ethylene concentration (wt-%)=$5.9\times 10^{-5}$) to initiate polymerization. Ethylene was supplied into the autoclave as necessary to maintain this ethylene partial pressure. The autoclave was externally cooled to keep the polymerization temperature at 80° C. for 1 hour. When the polymerization was terminated, the supply of ethylene was discontinued. The reactor was then cooled to a temperature of 50° C. The reactor was then degassed. The contents of the reactor were then withdrawn. The yield of a white particulate polyethylene was 135 g.

(5) Fractionation by Molecular Weight and Results of Measurement of Physical Properties The results of fractionation by molecular weight are set forth in Table 1. FIG. 1 is a log-log graph illustrating a plot of number-average molecular weight Mn (V) determined from determination of terminal vinyl group by $^{13}$C-NMR measurement vs. number-average molecular weight Mn by GPC of various fractions based on Table 1. Mn (V1), Mn (V2), $\log_{10}\{Mn (V1)/Mn (V2)\}$, and the results of measurement of physical properties are set forth in Table 2.

Example 2

The polymerization procedure of Example 1 was followed, except that 0.6 ml of a 1.0 mol/l hexane solution of diethyl aluminum ethoxide produced by Tosoh Akzo Corporation was added instead of trimethyl diethyl siloxyalane in the process (3) of Example 1. The yield of a white particulate polyethylene was 142 g. Mn (V1), Mn (V2), $\log_{10}\{Mn(V1)/Mn(V2)\}$, and the results of measurement of physical properties are set forth in Table 2.

Example 3

The polymerization procedure of Example 1 was followed, except that 0.6 ml of a 1.0 mol/l hexane solution of isobutyl alumoxane produced by Tosoh Akzo Corporation was added instead of methyl alumoxane in the process (3) of Example 1. The yield of a white particulate polyethylene was 118 g. Mn (V1), Mn (V2), $\log_{10}\{Mn(V1)/Mn(V2)\}$, and the results of measurement of physical properties are set forth in Table 2.

Example 4

(1) Synthesis of Bis(triphenylsilyl) Chromate

Chromium trioxide and triphenyl silanol were reacted with each other in accordance with the method described in U.S. Pat. No. 2,863,891.

(2) Preparation of Catalyst and Polymerization

The polymerization procedure of Example 1 was followed except that a catalyst prepared by adding 97.7 mg of bis(triphenylsilyl) chromate (supported amount of chromium atom: 0.20 wt-%) synthesized in the process (1) instead of bis(tert-butyl) chromate was used. The yield of a white particulate polyethylene was 139 g. Mn (V1), Mn (V2), $\log_{10}\{Mn(V1)/Mn(V2)\}$, and the results of measurement of physical properties are set forth in Table 2.

Example 5

The polymerization procedure of Example 1 was followed, except that a catalyst prepared by adding 97.7 mg of bis(triphenylsilyl) chromate (supported amount of chromium atom: 0.20 wt-%) synthesized in the process (1) of Example 4 instead of bis(tert-butyl) chromate and adding 0.6 ml of a 1.0 mol/l hexane solution of diethyl aluminum ethoxide produced by Tosoh Akzo Corporation instead of trimethyl diethyl siloxyalane. The yield of a white particulate polyethylene was 147 g. Mn (V1), Mn (V2), $\log_{10}\{Mn(V1)/Mn(V2)\}$, and the results of measurement of physical properties are set forth in Table 2.

Example 6

The polymerization procedure of Example 1 was followed, except that a catalyst prepared by adding 97.7 mg of bis(triphenylsilyl) chromate (supported amount of chromium atom: 0.20 wt-%) synthesized in the process (1) of Example 4 instead of bis(tert-butyl) chromate and adding 0.6 ml of a 1.0 mol/l hexane solution of isobutyl alumoxane produced by Tosoh Akzo Corporation instead of methyl alumoxane. The yield of a white particulate polyethylene was 124 g. Mn (V1), Mn (V2), $\log_{10}\{Mn(V1)/Mn(V2)\}$, and the results of measurement of physical properties are set forth in Table 2.

Example 7

The polymerization procedure of Example 3 was followed, except that hydrogen was introduced into the reactor at a partial pressure of 1.0 Kg/cm$^2$ (hydrogen concentration in isobutane: $5.2 \times 10^{-3}$ wt-%; hydrogen concentration (wt-%)/ethylene concentration (wt-%) =$3.1 \times 10^{-4}$). The yield of a white particulate polyethylene was 112 g. Mn (V1), Mn (V2), $\log_{10}\{Mn(V1)/Mn(V2)\}$, and the results of measurement of physical properties are set forth in Table 2.

Example 8

The polymerization procedure of Example 3 was followed, except that hydrogen was introduced into the reactor at a partial pressure of 2.0 Kg/cm$^2$ (hydrogen concentration in isobutane: $1.0 \times 10^{-2}$ wt-%; hydrogen concentration (wt-%)/ethylene concentration (wt-%) =$5.9 \times 10^{-4}$). The yield of a white particulate polyethylene was 106 g. Mn (V1), Mn (V2), $\log_{10}\{Mn(V1)/Mn(V2)\}$, and the results of measurement of physical properties are set forth in Table 2.

Example 9

The polymerization procedure of Example 5 was followed, except that hydrogen was introduced into the reactor at a partial pressure of 1.0 Kg/cm$^2$ (hydrogen concentration in isobutane: $5.2 \times 10^{-3}$ wt-%; hydrogen concentration (wt-%)/ethylene concentration (wt-%)=$3.1 \times 10^{-4}$). The yield of a white particulate polyethylene was 139 g. Mn (V1), Mn (V2), $\log_{10}\{Mn(V1)/Mn(V2)\}$, and the results of measurement of physical properties are set forth in Table 2.

Example 10

The polymerization procedure of Example 5 was followed, except that hydrogen was introduced into the reactor at a partial pressure of 2.0 Kg/cm$^2$ (hydrogen concentration in isobutane: $1.0 \times 10^{-2}$ wt-%; hydrogen concentration (wt-%)/ethylene concentration (wt-%)=$5.9 \times 10^{-4}$). The yield of a white particulate polyethylene was 130 g. Mn (V1), Mn (V2), $\log_{10}\{Mn(V1)/Mn(V2)\}$, and the results of measurement of physical properties are set forth in Table 2.

Example 11

(Gas Phase Polymerization)

A vertical oscillation type reactor (volume: 150 cm$^3$; diameter: 50 mm; oscillation speed: 420 times/min. (7 Hz); oscillation distance: 6 cm) resembling a fluidized bed reactor similar to that described in Eur. Polym. J., Vol. 21, 245 (1985) was made. Using this vertical oscillation type reactor, gas phase polymerization was effected. Into a reactor in which the air within had been replaced by nitrogen was charged an ampule which had 120 mg of the catalyst obtained in Example 5 enclosed therein in an atmosphere of nitrogen. The reactor was heated to a temperature of 90° C. where hydrogen was then introduced thereinto at a partial pressure of 0.3 Kg/cm$^2$. Ethylene was then pressed into the reactor at 14 Kg/cm$^2$. Oscillation was then initiated to destroy the ampule so that polymerization was initiated (hydrogen partial pressure/ethylene partial pressure=$2.1 \times 10^{-2}$). In order to maintain the predetermined ethylene pressure in the reactor, ethylene was supplied into the reactor through a flexible joint as necessary. Polymerization reaction was effected at a temperature of 90° C. for 2 hours. Thereafter, the supply of ethylene was discontinued. The reactor was then cooled to room temperature. The reactor was then degassed. The contents of the reactor were then withdrawn. The yield of a white particulate polyethylene was 34 g. Mn (V1), Mn (V2), $\log_{10}\{Mn(V1)/Mn(V2)\}$, and the results of measurement of physical properties are set forth in Table 2.

Example 12

The polymerization procedure of Example 11 was followed, except that hydrogen was introduced into the reactor at a partial pressure of 0.7 Kg/cm$^2$ (hydrogen partial pressure/ethylene partial pressure=$5.0 \times 10^{-2}$). The yield of a white particulate polyethylene was 30 g. Mn (V1), Mn (V2), $\log_{10}\{Mn(V1)/Mn(V2)\}$, and the results of measurement of physical properties are set forth in Table 2.

Example 13

The polymerization procedure of Example 11 was followed, except that hydrogen was introduced into the reactor at a partial pressure of 1.1 Kg/cm² (hydrogen partial pressure/ethylene partial pressure=7.9×10⁻²). The yield of a white particulate polyethylene was 28 g. Mn (V1), Mn (V2), $\log_{10}\{Mn (V1)/Mn (V2)\}$, and the results of measurement of physical properties are set forth in Table 2.

Comparative Example 1

The polymerization procedure of Example 3 was followed, except that the hydrogen partial pressure was changed to 3.0×10⁻⁶ as calculated in terms of hydrogen concentration (wt-%)/ethylene concentration (wt-%) and the polymerization temperature was changed to 85° C. As a result, 127 g of a polyethylene was obtained. Mn (V1), Mn (V2), $\log_{10}\{Mn (V1)/Mn (V2)\}$, and the results of measurement of physical properties are set forth in Table 2. The polyethylene thus obtained exhibited a high melt tension but underwent melt fracture.

Comparative Example 2

The polymerization procedure of Example 3 was followed, except that the hydrogen partial pressure was changed to 8.0×10⁻⁶ as calculated in terms of hydrogen concentration (wt-%)/ethylene concentration (wt-%) and the polymerization temperature was changed to 70° C. As a result, 101 g of a polyethylene was obtained. Mn (V1), Mn (V2), $\log_{10}\{Mn (V1)/Mn (V2)\}$, and the results of measurement of physical properties are set forth in Table 2. The polyethylene thus obtained underwent no melt fracture but exhibited a low melt tension.

Comparative Example 3

The polymerization procedure of Example 3 was followed, except that the hydrogen partial pressure was changed to 3.0×10⁻⁶ as calculated in terms of hydrogen concentration (wt-%)/ethylene concentration (wt-%) and the polymerization temperature was changed to 88° C. As a result, 131 g of a polyethylene was obtained. Mn (V1), Mn (V2), $\log_{10}\{Mn (V1)/Mn (V2)\}$, and the results of measurement of physical properties are set forth in Table 2. The polyethylene thus obtained exhibited a high melt tension but underwent melt fracture.

Comparative Example 4

The polymerization procedure of Example 3 was followed, except that the hydrogen partial pressure was changed to 8.0×10⁻⁶ as calculated in terms of hydrogen concentration (wt-%)/ethylene concentration (wt-%) and the polymerization temperature was changed to 73° C. As a result, 109 g of a polyethylene was obtained. Mn (V1), Mn (V2), $\log_{10}\{Mn (V1)/Mn (V2)\}$, and the results of measurement of physical properties are set forth in Table 2. The polyethylene thus obtained underwent no melt fracture but exhibited a low melt tension.

Comparative Example 5

The polymerization procedure of Example 3 was followed, except that the hydrogen partial pressure was changed to 3.0×10⁻⁶ as calculated in terms of hydrogen concentration (wt-%)/ethylene concentration (wt-%) and the polymerization temperature was changed to 92° C. As a result, 137 g of a polyethylene was obtained. Mn (V1), Mn (V2), $\log_{10}\{Mn (V1)/Mn (V2)\}$, and the results of measurement of physical properties are set forth in Table 2. The polyethylene thus obtained exhibited a high melt tension but underwent melt fracture.

Comparative Example 6

The polymerization procedure of Example 3 was followed, except that the hydrogen partial pressure was changed to 8.0×10⁻⁶ as calculated in terms of hydrogen concentration (wt-%)/ethylene concentration (wt-%) and the polymerization temperature was changed to 77° C. As a result, 114 g of a polyethylene was obtained. Mn (V1), Mn (V2), $\log_{10}\{Mn (V1)/Mn (V2)\}$, and the results of measurement of physical properties are set forth in Table 2. The polyethylene thus obtained underwent no melt fracture but exhibited a low melt tension.

Comparative Example 7

The polymerization procedure of Example 3 was followed, except that no hydrogen was introduced so that the hydrogen partial pressure was 0 as calculated in terms of hydrogen concentration (wt-%)/ethylene concentration (wt-%) and the polymerization temperature was changed to 85° C. As a result, 132 g of a polyethylene was obtained. Mn (V1), Mn (V2), $\log_{10}\{Mn (V1)/Mn (V2)\}$, and the results of measurement of physical properties are set forth in Table 2. The polyethylene thus obtained underwent no melt fracture but exhibited a low melt tension.

Comparative Example 8

The polymerization procedure of Example 5 was followed, except that the hydrogen partial pressure was changed to 2.0×10⁻⁴ as calculated in terms of hydrogen partial pressure (Kg/cm²)/ethylene partial pressure and the polymerization temperature was changed to 93° C. As a result, 38 g of a polyethylene was obtained. Mn (V1), Mn (V2), $\log_{10}\{Mn (V1)/Mn (V2)\}$, and the results of measurement of physical properties are set forth in Table 2. The polyethylene thus obtained exhibited a high melt tension but underwent melt fracture.

Comparative Example 9

The polymerization procedure of Example 5 was followed, except that the hydrogen partial pressure was changed to 9.0×10⁻⁴ as calculated in terms of hydrogen partial pressure (Kg/cm²)/ethylene partial pressure and the polymerization temperature was changed to 80°C. As a result, 30 g of a polyethylene was obtained. Mn (V1), Mn (V2), $\log_{10}\{Mn (V1)/Mn (V2)\}$, and the results of measurement of physical properties are set forth in Table 2. The polyethylene thus obtained underwent no melt fracture but exhibited a low melt tension.

TABLE 1

Results of fractionation by molecular weight in Example 1

| Fraction No. | Butyl cellosolve/ xylene | Temperature (°C.) | Recovery (%) | GPC Mn × 10⁻⁴ | GPC Mn × 10⁻⁴ | GPC Mw/Mn | ¹³C-NMR Terminal vinyl group (groups/1000 carbon atoms) | Mn (V) × 10⁻⁴ |
|---|---|---|---|---|---|---|---|---|
| Original | — | — | — | 1.22 | 33.90 | 27.79 | 1.15 | 1.22 |
| 1 | 100/0 | 23 | 0.3 | 0.06 | 0.08 | 1.33 | | |
| 2 | 100/0 | 126 | 6.5 | 0.19 | 0.31 | 1.63 | 7.37 | 0.19 |
| 3 | 80/20 | 126 | 7.6 | 0.65 | 0.85 | 1.31 | 2.15 | 0.65 |
| 4 | 70/30 | 126 | 9.2 | 1.34 | 1.72 | 1.28 | 1.04 | 1.34 |
| 5 | 60/40 | 126 | 21.7 | 3.14 | 4.09 | 1.30 | 0.444 | 3.15 |
| 6 | 55/45 | 126 | 17.0 | 7.65 | 9.51 | 1.24 | 0.135 | 10.36 |
| 7 | 50/50 | 126 | 22.1 | 19.44 | 29.08 | 1.50 | 0.0507 | 27.64 |
| 8 | 0/100 | 126 | 15.6 | 71.47 | 132.63 | 1.86 | 0.0147 | 95.24 |
| | | Total | 100.0 | | | | | |

TABLE 2

$\log_{10}$ (Mn (V1)/Mn (V2)) and results of measurement of physical properties

| Example No. | Polymerization process | H/E ratio[a] | HLMFR (g/10 min) | MLMFR (g/10 min) | HLMFR/ MLFMR | Mn (V1) × 10⁻⁴ | Mn (V2) × 10⁻⁴ | $\log_{10}$ (Mn (V1)/ (Mn (V2)) | SR (%) | Melt tension (g) |
|---|---|---|---|---|---|---|---|---|---|---|
| 1 | Slurry | 5.9 × 10⁻⁵ | 3.2 | 0.39 | 8.2 | 1.00 | 14.00 | 1.15 | 60 | 35.2 |
| 2 | Slurry | 5.9 × 10⁻⁵ | 3.3 | 0.40 | 8.3 | 1.00 | 14.20 | 1.15 | 62 | 35.1 |
| 3 | Slurry | 5.9 × 10⁻⁵ | 3.5 | 0.43 | 8.1 | 1.00 | 14.20 | 1.15 | 60 | 34.1 |
| 4 | Slurry | 5.9 × 10⁻⁵ | 4.2 | 0.48 | 8.8 | 1.00 | 14.70 | 1.17 | 63 | 36.2 |
| 5 | Slurry | 5.9 × 10⁻⁵ | 4.3 | 0.47 | 9.1 | 1.00 | 14.00 | 1.17 | 60 | 36.8 |
| 6 | Slurry | 5.9 × 10⁻⁵ | 3.9 | 0.46 | 8.5 | 1.00 | 14.70 | 1.17 | 64 | 35.4 |
| 7 | Slurry | 3.1 × 10⁻⁴ | 12.5 | 1.6 | 7.8 | 1.00 | 20.90 | 1.32 | 72 | 30.4 |
| 8 | Slurry | 5.9 × 10⁻⁵ | 33.5 | 4.78 | 7.1 | 1.00 | 46.80 | 1.67 | 81 | 21.1 |
| 9 | Slurry | 3.1 × 10⁻⁴ | 14.3 | 2.0 | 7.2 | 1.00 | 21.40 | 1.33 | 74 | 29.8 |
| 10 | Slurry | 5.9 × 10⁻⁵ | 34.1 | 4.8 | 7.1 | 1.00 | 51.30 | 1.71 | 80 | 20.6 |
| 11 | Gas phase | 2.1 × 10⁻² | 4.1 | 0.62 | 6.6 | 1.00 | 15.20 | 1.18 | 52 | 35.1 |
| 12 | Gas phase | 5.0 × 10⁻² | 15.0 | 2.3 | 6.5 | 1.00 | 22.40 | 1.35 | 64 | 28.4 |
| 13 | Gas phase | 7.9 × 10⁻² | 32.6 | 4.9 | 6.7 | 1.00 | 53.70 | 1.73 | 73 | 20.2 |
| Comp. | | | | | | | | | | |
| 1 | Slurry | 3.0 × 10⁻⁵ | 4.2 | 0.48 | 8.6 | 1.00 | 10.10 | 1.00 | * | 45.3 |
| 2 | Slurry | 8.0 × 10⁻³ | 4.1 | 0.55 | 7.5 | 1.00 | 1240.50 | 3.09 | 31 | 15.1 |
| 3 | Slurry | 3.0 × 10⁻⁵ | 14.5 | 1.7 | 8.5 | 1.00 | 10.05 | 1.00 | * | 36.4 |
| 4 | Slurry | 8.0 × 10⁻³ | 15.2 | 2.1 | 7.2 | 1.00 | 1185.00 | 3.07 | 21 | 10.2 |
| 5 | Slurry | 3.0 × 10⁻⁵ | 33.5 | 3.9 | 8.6 | 1.00 | 10.05 | 1.00 | * | 28.7 |
| 6 | Slurry | 8.0 × 10⁻³ | 34.8 | 5.3 | 6.6 | 1.00 | 1260.50 | 3.10 | 51 | 6.4 |
| 7 | Slurry | 0 | 5.0 | 0.55 | 9.1 | 1.00 | 10.10 | 1.00 | * | 49.7 |
| 8 | Gas phase | 2.0 × 10⁻⁴ | 4.2 | 0.58 | 7.2 | 1.00 | 10.10 | 1.00 | * | 43.7 |
| 9 | Gas phase | 9.0 × 10⁻¹ | 4.1 | 0.68 | 6.0 | 1.00 | 1380.0 | 3.14 | 30 | 14.8 |

[a]H/E ratio represents hydrogen concentration/ethylene concentration or hydrogen partial pressure/ethylene partial pressure
*Immeasurable due to melt fracture

Industrial Applicability

In accordance with the present invention, a blow-moldable or extrudable ethylene polymer having an excellent moldability which gives a molded product free of roughened surface can be efficiently produced. Thus, the present invention has an industrial value.

What is claimed is:

1. A blow-moldable or extrudable ethylene polymer having:

a number-average molecular weight Mn (V1) as determined from the amount of a terminal vinyl group by ¹³C-NMR measurement with respect to a fraction having a number-average molecular weight Mn of 100,000 according to GPC; and a number-average molecular weight Mn (V2) as determined from the amount of a terminal vinyl group by ¹³C-NMR measurement with respect to a fraction having a number-average molecular weight Mn of 10,000 according to GPC, Mn(V1) and Mn(V2) satisfying the following relationship:

$$1.01 \leq \log_{10}\{Mn(V1)/Mn(V2)\} \leq 3.0$$

and having a melt flow rate (HLMFR) of from 0.1 to 70 g/10 min.

2. A process for the production of a blow-moldable or extrudable ethylene polymer, which comprises the production of the ethylene polymer in the presence of a catalyst comprising (a) chromic acid ester, (b) an alumoxane and (c) an aluminum alkoxide and/or organic aluminum siloxide all supported on a carrier, wherein the catalyst is obtained by separating said catalyst from a solvent, wherein the content of high molecular components is controlled such that said ethylene polymer exhibits:
a number-average molecular weight Mn (V1) as determined from the amount of a terminal vinyl group by $^{13}$C-NMR measurement with respect to a fraction having a number-average molecular weight Mn of 100,000 according to GPC; and
a number-average molecular weight Mn (V2) as determined from the amount of a terminal vinyl group by $^{13}$C-NMR measurement with respect to a fraction having a number-average molecular weight Mn of 10,000 according to GPC, Mn (V1) and Mn (V2) satisfying the following relationship:

$$1.01 \leq \log_{10}\{Mn(V1)/Mn(V2)\} \leq 3.0.$$

3. The process for the production of an ethylene polymer according to claim 2, which comprises liquid phase polymerization of ethylene in the presence of hydrogen supplied into the polymerization reactor under the following condition:

$5.0 \times 10^{-6} \leq$ Hydrogen concentration in liquid phase (wt-%)/Ethylene concentration in liquid phase (wt-%) $\leq 5.0 \times 10^{-3}$.

4. The process for the production of an ethylene polymer according to claim 2, which comprises gas phase polymerization of ethylene in the presence of hydrogen supplied into the polymerization reactor under the following condition:

$5.0 \times 10_{-4} \leq$ Hydrogen partial pressure in gas phase (Kg/cm$^2$)/Ethylene partial pressure in gas phase (Kg/cm$^2$) $\leq 5.0 \times 10^{-1}$.

5. The process for the production of an ethylene polymer according to claim 2, using a catalyst obtained by allowing (a) a chromic acid ester to be supported on a carrier and contacting the supported chromic acid ester with (b) an alumoxane and (c) an organic aluminum alkoxide and/or organic aluminum siloxide.

6. The process for the production of an ethylene polymer according to claim 2, using a catalyst wherein the mixing ratios of (a) chromic acid ester to other components (b) and (c) are as follows:

the molar ratio of aluminum atom in an alumoxane/chromium atom is from 0.5/1 to 100/1;

the molar ratio of aluminum atom in (c) organic aluminum alkoxide and/or organic aluminum siloxide/chromium atom is from 0.5/1 to 100/1; and the molar ratio of (b) an alumoxane to (c) organic aluminum alkoxide and/or organic aluminum siloxide is from 0.01/1 to 100/1.

7. The process for the production of an ethylene polymer according to claim 2, wherein the carrier is an inorganic metal oxide and/or inorganic halide.

8. The process for the production of an ethylene polymer according to claim 2, wherein the catalyst comprises a carrier having a specific surface area of from 50 to 1,000 m$^2$/g, a pore volume of from 0.5 to 3.0 cm$^3$/g and an average particle diameter of from 10 to 200 μm, and a chromium atom supported on the carrier in an amount of from 0.05 to 5.0 wt-% based on the weight of the carrier.

* * * * *